United States Patent [19]

Weng

[11] Patent Number: 5,396,890
[45] Date of Patent: Mar. 14, 1995

[54] THREE-DIMENSIONAL SCAN CONVERTER FOR ULTRASOUND IMAGING

[75] Inventor: Lee Weng, Issaquah, Wash.

[73] Assignee: Siemens Medical Systems, Inc., Iselin, N.J.

[21] Appl. No.: 129,746

[22] Filed: Sep. 30, 1993

[51] Int. Cl.$^6$ .......................... A61B 8/00; G06F 15/42
[52] U.S. Cl. .................. 128/660.07; 128/916; 364/413.25; 382/44
[58] Field of Search ............. 128/660.05, 660.07, 128/660.09, 661.01, 916; 73/626; 382/44–47; 364/413.22, 413.25

[56] References Cited

U.S. PATENT DOCUMENTS

| Re. 30,397 | 9/1980 | King ............................. 128/660 |
|---|---|---|
| 4,241,412 | 12/1980 | Swain ........................... 364/731 |
| 4,245,250 | 1/1981 | Tiemann ........................ 358/140 |
| 4,271,706 | 6/1981 | Ledley ....................... 128/916 X |
| 4,292,977 | 10/1981 | Krause et al. ................. 128/712 |
| 4,310,907 | 1/1982 | Tachita et al. ................. 367/11 |
| 4,313,163 | 1/1982 | Mizutani ....................... 364/414 |
| 4,468,747 | 8/1984 | Leavitt et al. ................. 364/577 |
| 4,471,449 | 9/1984 | Leavitt et al. ................. 364/577 |
| 4,562,540 | 12/1985 | Devaney ........................ 364/400 |
| 4,582,065 | 4/1986 | Adams .......................... 128/661.01 |
| 4,594,662 | 6/1986 | Devaney ........................ 364/400 |
| 4,596,145 | 6/1986 | Smith et al. .................... 73/626 |
| 4,598,366 | 7/1986 | Devaney ........................ 364/400 |
| 4,694,434 | 9/1987 | von Ramm et al. ............... 367/7 |
| 4,777,598 | 10/1988 | Kellar et al. ................... 364/413.22 |
| 4,831,528 | 5/1989 | Crawford et al. ................ 364/413.22 |
| 4,835,688 | 5/1989 | Kimura ......................... 364/413.22 |
| 4,866,612 | 9/1989 | Takagi et al. ................... 364/413.22 |
| 4,868,748 | 9/1989 | Crawford et al. ................ 364/413.22 |
| 5,078,145 | 1/1992 | Furuhata ....................... 128/660.07 |
| 5,081,993 | 1/1992 | Kitney et al. ................... 128/661.08 |
| 5,152,294 | 10/1992 | Mochizuki et al. ............... 128/916 X |
| 5,159,931 | 11/1992 | Pini ............................ 128/916 X |
| 5,329,929 | 7/1994 | Sato et al. ..................... 128/916 X |

OTHER PUBLICATIONS

Digital Scan Converters in Diagnostic Ultrasound Imaging by J. Ophir and N. F. Maklad, Proc. IEEE, vol. 67, No. 4, Apr., 1979, pp. 654–664.

Interplolation Scan Conversion in Pulse-Echo Ultrasound by D. E. Robinson and P. C. Knight, Ultrasonic Imaging 4, 1982, pp. 297–310.

Digital Scan Converters in Medical Ultrasound Imaging, Lee Weng, Master's Thesis, Apr. 10, 1986.

New scans from old: digital reformatting of ultrasound images by M. Halliwell, H. Key, D. Jenkins, P. C. Jackson, and P. N. T. Wells, The British Journal of Radiology, 62, Sep., 1989, pp. 824–829.

Incremental Volume Rendering Algortihm For Interactive 3D Ultrasound Imaging by R. Ohbuchi and H. Fuchs, 12th International Conference, IPMI '91 Proceedings Springer-Verlag, 1991, pp. 486–500.

Primary Examiner—Francis Jaworski

[57] ABSTRACT

A method and apparatus of a three-dimensional scan converter system for generating real-time C-scan and transparent images in addition to two-dimensional B-scan images in an ultrasound imaging system. The present invention has means for ultrasonically scanning a subject to obtain image data, an image memory means for storing the image dam, a two-dimensional scan converter means for converting the stored image data into a three-dimensional cubic data matrix, and a means for displaying the image.

6 Claims, 6 Drawing Sheets

SYSTEM FLOW CHART

BUFFER 1    BUFFER 2

FLOW CHART OF EMBODIMENT ONE

FLOW CHART OF EMBODIMENT TWO

THREE-DIMENSIONAL SCAN CONVERTER FOR ULTRASOUND IMAGING

BACKGROUND OF THE INVENTION

1. Field of the Invention

The present invention is directed generally to a three-dimensional scan converter (3D SC) for use in 3D ultrasound imaging, and specifically to a 3D SC apparatus that converts the input 3D data in linear-linear, sector-linear, sector-sector and linear-sector scan formats to a cubic rasterized data matrix.

2. Background of the Invention

Two-dimensional ultrasound imaging has been widely used in cardiology, radiology and other clinical diagnostic areas for more than thirty years, since J. J. Wild and J. M. Reid published their first paper of ultrasound medical B-scan imaging in *Science* in 1952. As an example, two-dimensional echocardiography offered considerable advantages over M-mode echocardiography because of the ability to provide real-time tomographic images of the heart, and it extended the ability of practitioners to make complex diagnostic decisions. In the beginning, there were questions by some whether two-dimensional approaches were worth the tithe and expense. Continued experience with these methods provided an opportunity for clinicians to ask new questions. Although similar questions have been directed to three-dimensional ultrasound imaging for years, three-dimensional echography appears to be a desirable goal as it would likely provide a method for deriving new anatomical and functional indices of the human heart and other organs.

Early efforts on the investigation of three-dimensional ultrasound imaging can be tracked back to later 50's to earlier 70's. But the results on 3-D medical ultrasound imaging, such as, ultrasound transmission tomography and holography, were unfortunately disappointing because of poor image quality caused by the diffraction effect, sound speed variations in tissues and the penetration limitation of sound in some tissues and organs, such as bone and lung. Data acquisition and image reconstruction speed was too slow to provide any meaningful and practical clinical use. Even though the investigation never stopped, the public interest in 3-D ultrasound imaging kept a low profile for a long time.

Following recent advances in computer technology and high-speed digital electronics interest in three-dimensional medical ultrasound imaging has gradually recovered. High speed 3-D imaging systems with heavy parallel processing have been built to supply as fast as 15 volume-per-second real-time imaging frame rate, even though the image quality is still very poor compared with the image standard for the up-to-date two-dimensional B-scan. The clinical applications of ultrasound three-dimensional imaging have been reported in many areas, from cardiology to ophthalmology.

The benefits to be obtained from current 3-D ultrasound imaging system are still debated because of the low frame rate and low signal-to-noise ratio. Both these existing problems could be overcome in the future with the advance of technology. It is clear that there are strong, and gradually increasing clinical needs for this type of imaging modality. Vast literature has been published in recent years on the clinical applications of the ultrasound three-dimensional imaging technique.

In cardiology, despite the obvious advantages of two-dimensional echocardiography methods over M-mode, serious limitations remain. It is important to obtain a short axis B-mode sector scan of the left ventricle of the heart. But it is limited to some extent by the acoustic windows offered by the rib cage and the lungs. With a three dimensional imaging system, a C-scan plane can be walked vertically through the sector, providing short axis view at any desired level, from the apex, through the center of the ventricle, through to the level of the mitral valve and beyond. In some patients, such a variety of scans would not be available to the physician with a standard two-dimensional system, because of the restrictions of the acoustic window.

Cardiac structures are spatially complex and a mental picture of the heart must be acquired from a series of two-dimensional interrogations. For example, calculation of ventricular volume by echocardiography must be performed based upon complex geometric assumptions such as whether a ventricle is elliptical or not. In the setting of a severe regional wall-motion abnormality, the ventricle may not conform to any geometric assumption and the resultant quantitative volume information is, therefore, limited.

Likewise, quantitative assessment of wall motion data derived from two-dimensional echocardiography is subject to limitations imposed by the complex spatial forward and rotational movements of the heart between diasrole and systole. Almost all such computer based models are, therefore, inherently limited because it becomes spatially impossible to determine the same geometric center of the ventricle between diastole and systole for reliable determination of wall-motion indices.

In addition, the normal breast is characterized by a well-ordered spatial organization of the connective and glandular tissues. 3-D reconstruction allows surface analysis of the tumor smooth envelope, and is clearly distinct from the normal parenchyma. The adenocarcinoma has an irregular, jagged envelope, with poor limitations from the surrounding tissue. 3-D will lead to significant increases in specificity and sensitivity for breast tumor diagnosis with ultrasound and to better comprehension of cancer-dystrophy relationships. 3-D will also lead to progress in antenatal diagnosis through spatial visualization of fetal organs, and allow the development of new diagnostic and therapeutic procedures in utero.

Interventional Cardiology has grown very rapidly in recent years. Ultrasound imaging catheter has been used for thrombus and stenosis diagnostics during PTCA procedures. Because of lacking three-dimensional spatial scanning capability, current image interpretation is relying on physician's experience and still of manual catheter manipulation. In recent years, several prototype 3-D imaging catheters have been presented. By off-line processing, series 2-D image sections scanned in different depths are stacked together to reconstruct a three-dimensional coronary artery image. This 3-D image not only speeds the diagnostic process, but also increases the diagnostic efficacy by providing physicians the ability to view the diseased artery segment in all directions most of which are not accessible with conventional diagnostic techniques. Some of the prototypes even can open and flat the artery segment to let physicians inspect the inner wall of the artery which has very important information for the diagnosis.

During the past two decades, medicine has benefited from a trend toward minimally invasive procedures.

Miniature surgical devices are being developed that can be introduced through small incisions to perform many elective surgical procedures. Many of these procedures will require ultrasonic imaging techniques for guidance. In some situations, three-dimensional scanning capability, with automatic localization and display of the scan plane containing an interventional device, would help by eliminating the need to manually track the interventional device.

The three-dimensional ultrasound imaging and related tissue characterization methods have been applied fruitfully in a number of medical applications, including evaluation of intraocular tumors, cancers of the liver, clots and thrombi, skin lesions and prostate tissue.

More clinical applications of the three-dimensional ultrasound imaging will be discovered after the imaging system is commercially available and more physicians get familiar with this imaging technology.

Ultrasound's low cost, noninvasive, and repeatable way of capturing dynamic images have led to the widespread success of two-dimensional B-scan imaging. These benefits should apply equally for three-dimensional ultrasound imaging. Current 2-D imaging system can obtain sector, linear and other formats of real-time images in a frame rate greater than 30 frames per second. Image detail resolution has been pushed almost to the ultrasound diffraction resolution which is the ultimate limit in this type of imaging methodology. The contrast resolution has reached the negative 70 dB level. There is still a huge gap between the current two-dimensional image quality and the three-dimensional image quality which can be realistically achieved in the near future.

One major technical obstacle is how to convert 3D ultrasound scan formats, such as sector-sector, to regularized raster cubic data matrix for image processing and CRT display. Due to the huge amount of data received from 3D scan, the 3D scan conversion could take a long time if using conventional computation technique. This is not acceptable for real-time clinical requirements.

SUMMARY OF THE INVENTION

It is an object of the present invention to provide an apparatus of the type initially cited to convert the three-dimensional ultrasonically scanned image data into a cubic data matrix.

It is an object of the present invention to provide a real-time 3D the goal of this invention is to provide a real-time 3D scan converter which uses 2D scan converters and image memories in most of existing ultrasound imaging systems to accomplish the 3D scan conversion by two sets of 2D scan conversion in two orthogonal directions. This design significantly simplifies the conversion process and greatly reduces the computation need.

The above object is achieved in accordance with the principles of the present invention in an apparatus having a three-dimensional scan converter system for generating real-time C-scan and transparent images in addition to two-dimensional B-scan images in an ultrasound imaging system, comprising means for ultrasonically scanning a subject to obtain real-time image data representing an image of said subject, said ultrasonic scanning means further comprises transducers and a three-dimensional position control means having a position encoder for indicating current transducer position, image memory means for storing image data representing an image of a subject, two-dimensional scan converter means for converting the stored image data into three-dimensionally raster formatted stored image data in real-time, image processing means for operating on said three-dimensionally formatted stored image data for successive display of said orthogonal multiplanar images, system software and a CPU, having one or more look-up tables containing scan converter parameters corresponding to said transducer position therein, for downloading said parameters in real-time to said scan converter means, a raster processing means for compounding said transparent image, and display means for displaying said three-dimensional images.

The three-dimensional scan converter (3D SC) of the present invention provides real-time C-scan and transparent images in addition to the regular 2D B-scan images. In another embodiment of the three-dimensional scan converter of the present invention, the conversion is done only after the scan. The image data is saved in the image memory (IM) during the scan. This yields better interpolation quality and the image acquisition control is simpler than that of the first embodiment.

BRIEF DESCRIPTION OF THE DRAWINGS

The invention shall be set forth in greater detail by way of example with reference to the figures.

DESCRIPTION OF THE PREFERRED EMBODIMENTS

Figure 1:
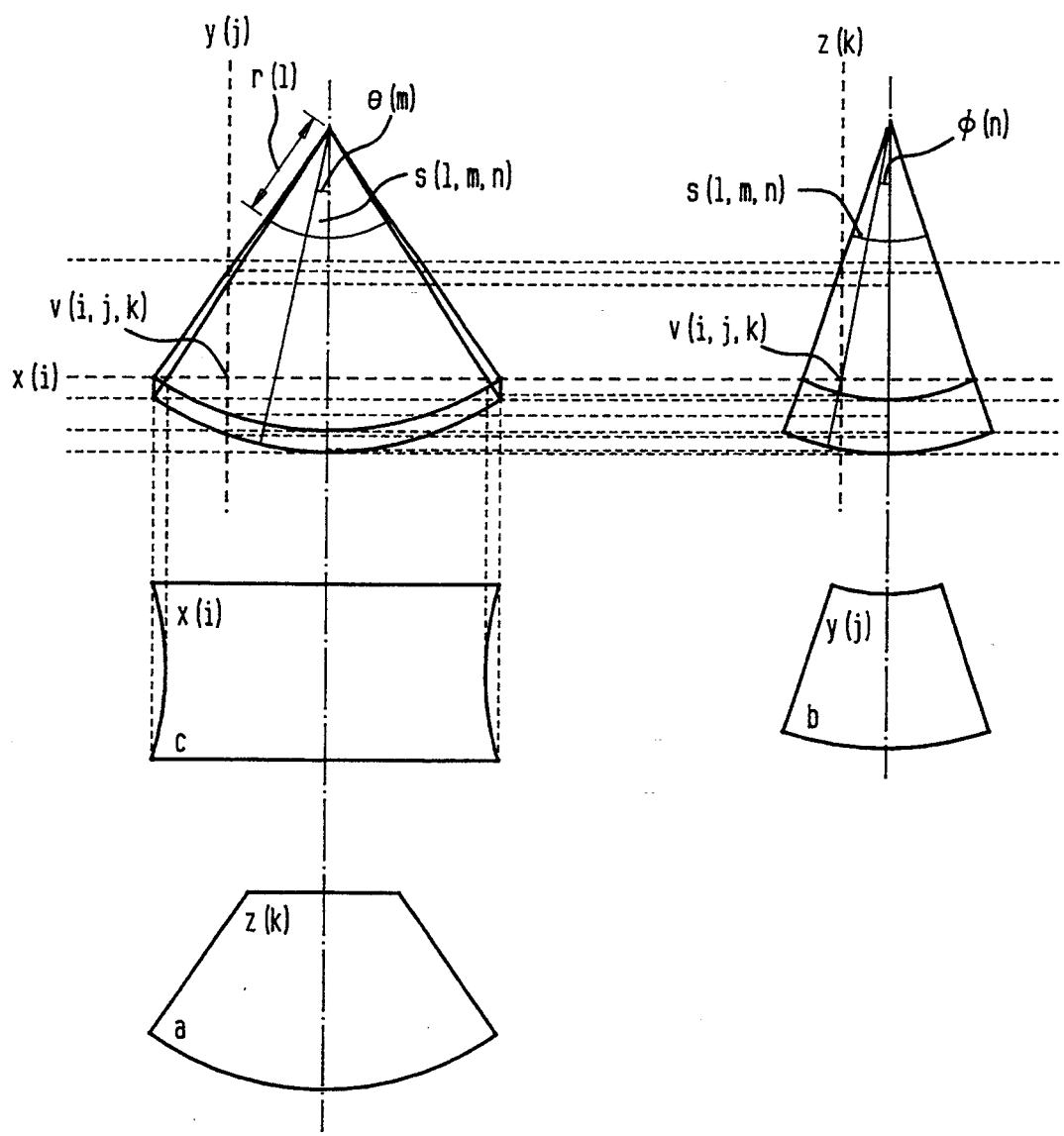
FIG. 1 shows the sector-sector scan format of the present invention.

Before a description of the preferred embodiments, the following terms as used herein have the following definitions. Multiplanar images are three orthogonal images in 2D planes, obtained from 3D scan volume data sets. One of the multiplanar images which is parallel with the transducer surface has been called C-scan x(i), in the literature. C means Constant depth. Also, a transparent image which is known otherwise as a Projection Image, is the result of spatial compounding of 2D images from a 3D data set. In grey-scale imaging (GSI) it looks similar to an X-ray image. The 3D ultrasound scan format is defined by its 2D scan format and the third dimension scan format. For example, a curved-linear format means that the curved array moves linearly in the transducer elevation direction. There are a number of other scan formats, such as linear-linear, sector-linear, sector-sector, linear-sector, and linear-circular. FIG. 1 shows the detail of sector-sector format as an example for further discussion. All scan formats are acquired in the restricted mode which means that the scan format and the 2D slice locations are defined before the scan begins.

Figure 1A:
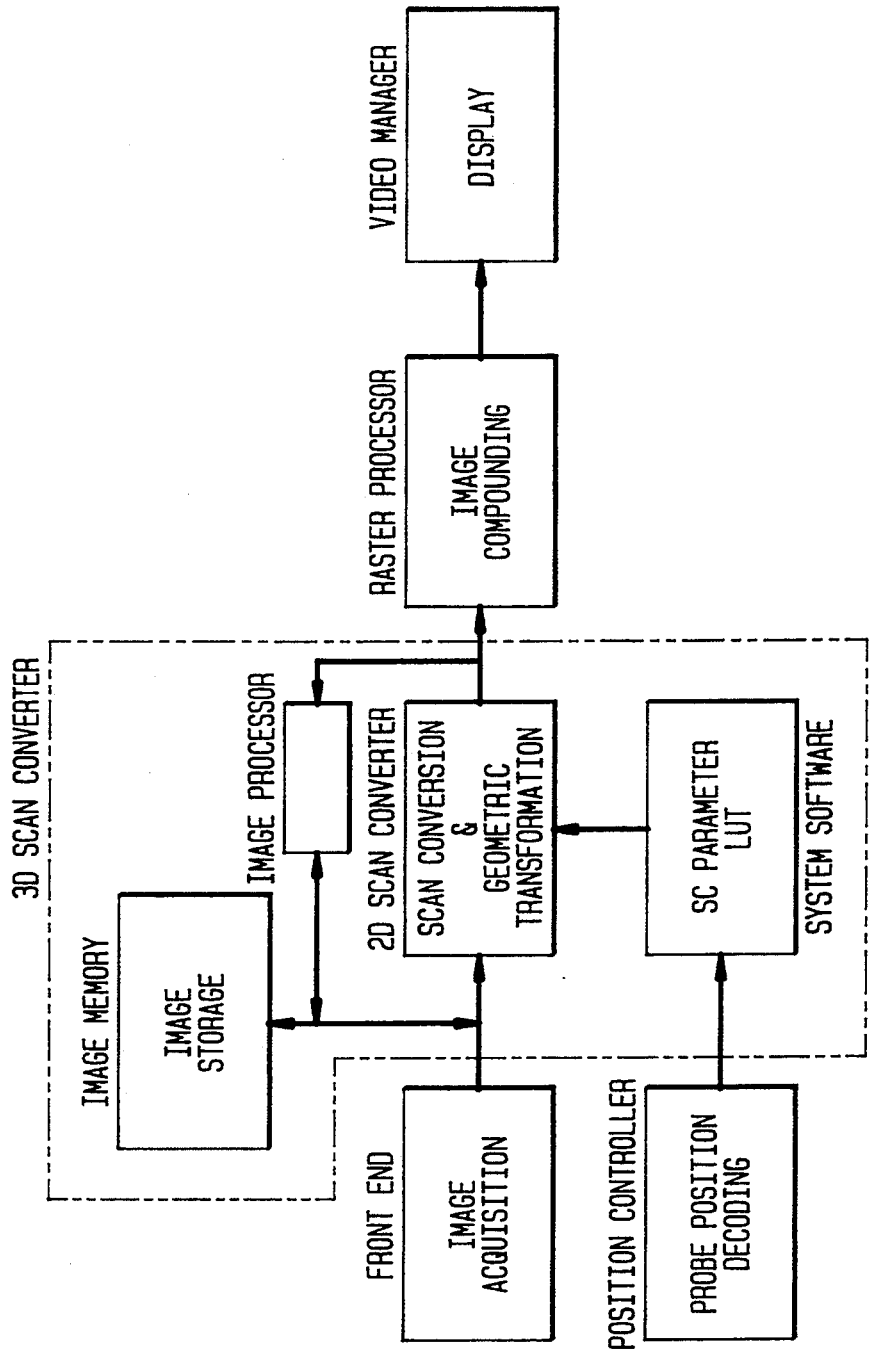
FIG. 1a shows the 3D scan converter within the 3D ultrasound imaging system of the present invention.

FIG. 1a shows the system flowchart of the present invention. Real-time 2D images are acquired by the array transducer which has a 3D position control attachment. The transducer is moving in the $\phi$ direction indicated in the FIG. 1. The transducer movement is provided by a motor or the operator's hand. In the 3D attachment, there is a position encoder which indicates the current transducer position. The number of 2D slices to form the 3D volume is fixed. During real-time scanning, one 2D slice, and only one 2D slice, for each transducer position is sent to the Image Memory (IM), as well as to the Scan Converter. For each transducer position, there is one set of SC parameters which is down-loaded into the SC from the look-up tables (LUTs) in the system memory controlled by system software. The parameters are different from one transducer position to the other for the sector-sector scan formats in the first embodiment of the present invention. The parameters should be down-loaded in real-time for every transducer position. For the second embodiment the parameters only need to be loaded once. The 2D scan converter is for image geometric transformation. The scan converter outputs images to the Raster Processor (RP) to form the transparent image and real-time C-scan image, which is then displayed after the Video Manager. The 2D SC output is also sent to the Image Processor (IP) and through which to the IM. Once every volume scan (the transducer moves from one end to the other), the IM sends image data to the SC to form three orthogonal images x(i), y(j) and z(k) shown in FIG. 1. The images are displayed in the other three quadrants of the screen. These images are updated for every volume scan (1-4 seconds for motor driven probe, or longer for manually driven probe).

Three multiplanar images x(i), y(j) and z(k) are orthogonal. In FIG. 1, the image x(i) is the C-scan image. The image y(j), which is orthogonal to the image x(i), is in the transducer elevation direction. The image z(k) is orthogonal to x(i) and y(j) at a constant distance from the transducer surface.

The transparent image is defined as the spatial projected compounding of the multiplanar images. The projection direction is defined as the normal direction of the multiplanar image.

The 3D SC consists of three parts, a 2D Scan Converter (2D SC), an Image Processor (IP) and an Image Memory (IM) in an ultrasound imaging system. To simplify the conversion process, the 3D SC uses multiple 2D scan conversions to complete the 3D scan conversion. In a first embodiment of the present invention, a 3D SC apparatus is provided which performs real-time C-scan and transparent imaging in addition to the regular 2D B-scan imaging. The interpolation quality is slightly lower than that of the second embodiment herein. Also, some special requirements on the image acquisition control in the elevation direction are needed.

In the first embodiment, the scan conversion process has two phases. In the first phase, the 2D SC converts the input 2D B-scan image from sector format to rectangular format. The output image is the projected view of the input image on the center plane in the transducer elevation direction. The output image is stored in Image Memory (IM) and the Image Processor (IP). In the second phase, the 2D SC reads the stored image data in the C-scan plane and converts the image from one rectangular format to another rectangular format which has the correct shape and size in the 3D space. The output image from the second conversion is then stored back to the IM. All image interpolations in both scan conversions are limited in the 2D plane to simplify the process. After one sector-to-rectangular and another rectangular-to-rectangular scan conversion, the image data inside the IM has been converted from sector-sector format to raster cubic format. The converted data matrix is used to form multiplanar, oblique and volumetric images. A critical step to simplify the scan conversion of the second phase is to acquire the input 2D slices in a manner which allows the parallel intersection lines of the 2D slices to have equal space on the C-scan plane. In this case, the 2D slices are acquired not in equally spaced angular increments but in equally spaced tangent angular increments during scanning in the transducer elevation direction $\phi$. One or multiple real-time C-scan images are formed inside the IP. One real-time transparent image is formed with the assistance of the Raster Processor (RP).

In a second embodiment of the present invention, a 3D SC apparatus is disclosed which does the conversion only after the scan. The image data is saved in the IM during the scan. The interpolation quality is better in this embodiment than in the first embodiment disclosed. Also the image acquisition control is simpler than that of the first embodiment.

In the second embodiment of the present invention, during image acquisition, the 2D SC first converts the input 2D slices from sector to rectangular format. The SC output is stored back to IM through IP. Only regular real-time B-scan images are displayed. The transducer scans in its elevation direction $\phi$ in equally spaced angular increments. After image acquisition, the 2D SC reads the image data out of IM in the vertical plane which is perpendicular to the B-scan slices. The 2D SC converts the image data from sector to rectangular format and then sends it back to IM. After two sector-to-rectangular conversions, the image data in IM has beep converted to a cubic matrix. Multiplanar, oblique, and other images can be formed based on the data matrix.

FIG. 1 shows the sector-sector scan format, where r(l): the radius distance of the l$^{th}$, sample on an acoustic vector, r(l)=0, l:l=1,2, . . . L, where L is the total number of samples on a vector;

$\phi$(m): the angle between the m$^{th}$ vector and the center vector on the same scan plane, the total number of vectors on a plane is 2M+1$\Theta$(M)=0, $\Theta$(m)= $-\Theta$(2M+1$-$m), where m:m=1,2, . . . 2M+1;

$\phi$(n): the angle between the n$^{th}$ scan plane and the center plane in the transducer elevation scan direction, the total number of planes in the 3D scan volume is 2N+1, $\phi$(N)=0, $\phi$(n)= $-\phi$(2N+1$-$n), where n:n=1,2, . . . 2N +1.

The sample value at 3D space location (l,m,n) is s(l,m,n). The sample data is stored vector by vector in the IM shown in FIG. 2.

Figure 3:
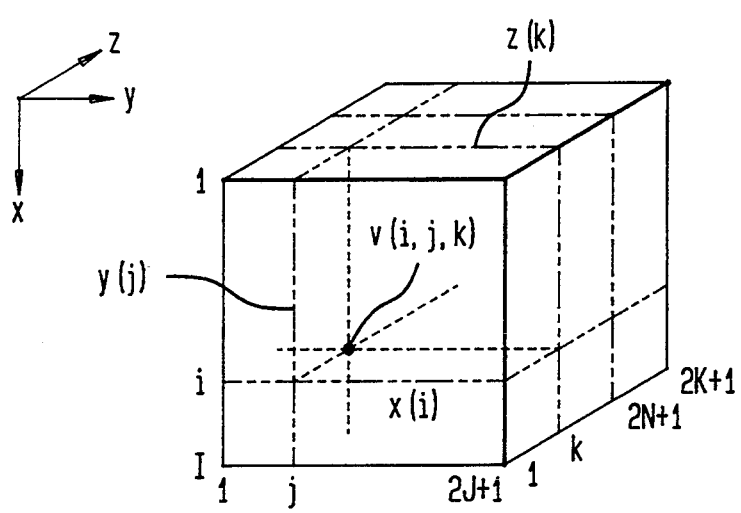
FIG. 3 shows a sample data set converted to a cubic voxel matrix of the present invention.

The 3D SC converts the sample data set to a cubic voxel matrix shown in FIG. 3. To simplify the discussion, the following definitions are used in reference to FIG. 1 and FIG. 3;

x(i): the distance from the apex of the scan volume (l=1) to a plane which has vector (l,M,N) as its normal vector. x(1)=0, and i:i=1 to I. I is the total number of planes from top to bottom of the cubic volume shown in FIG. 3;

y(j): the distance from the apex to a plane which is parallel to the plane defined by (l,M,n), for any l and n. y(J)=0, y(J)=−y(2J+1−j), and j:j=1 to 2J+1. In the cubic voltime in FIG. 3, the total number of planes from left to right is 2J+1.

z(k): the distance from the apex to a plane which is parallel to the plane defined by (l,m,N), for any l arid m. z(K)=0, z(k)=−z(2K+1−k), and k:k=1 to −2K+1. In the cubic volume in FIG. 3, the total number of planes from front to back is 2K+1. Each 3D voxel location is represented as (i,j,k), and the voxel value is v(i,j,k).

As stated above, there are three pieces of hardware involved in the 3D SC: 2D SC, IM and IP. A known programmable 2D SC is fully capable of handling the necessary processing.

Figure 2:
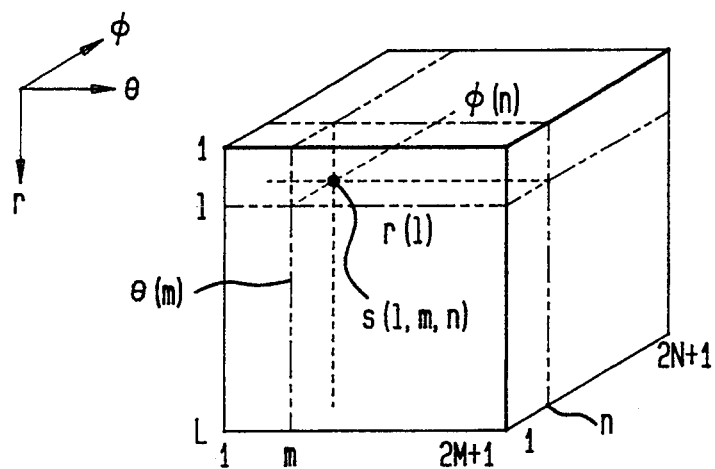
FIG. 2 shows the sample data storage vector by vector in the image memory (IM) of a sample value in 3D space location.

To simplify the discussion of the Image Memory (IM), assume that the IM has a cubic shape structure as shown in FIGS. 2 and 3. If the smallest access unit of the IM is a vector, this vector should have, at any time, one of the three directions as defined in FIGS. 2 and 3. For example, in regular 2D mode, the vector in IM is defined in the r direction in FIG. 2 or the x direction in FIG. 3. The other two directions are controlled by vector number and frame number in the image transfer header file. In 3D mode, besides this definition, under system CPU control, the IM is able to consider the vector in both $\Theta$ and $\phi$ directions. If the vector is defined in the $\Theta$ direction, the vector number and the frame number in the header file control the $\phi$ direction and the r direction. Under system software control, an address multiplexer in the IM can switch the direction definition. Further, with respect to the IP necessary for 3D scan conversion, only a few image frame buffers are required inside the IP. In addition to the stated three pieces of hardware (2D SC, IM, and IP), the system CPU controls several look-up tables (LUTs) which hold the scan conversion parameters.

First Embodiment

Figure 8:
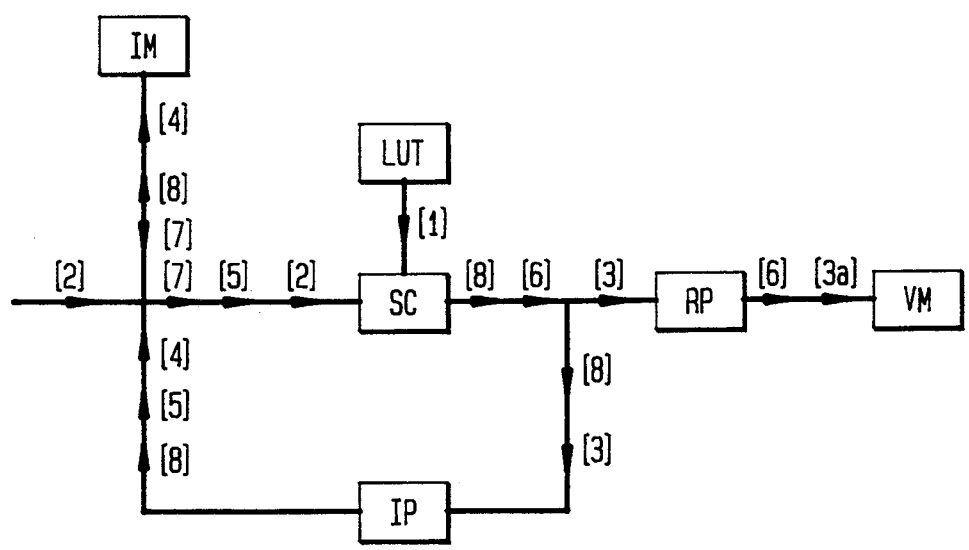
FIG. 8 shows a flowchart of first embodiment of a scan converter of the present invention.

FIG. 8 shows a flowchart of the first embodiment of the 3D scan converter design of the present invention.

Image Acquisition Control

Figure 4:
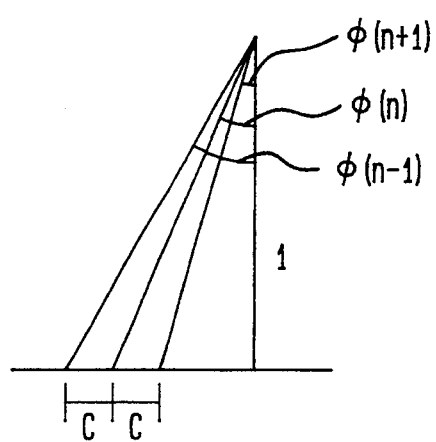
FIG. 4 shows a representation of how 2D images are acquired with constant tangent-angle intervals between the scan plane of the present invention.

A regular phased array or tightly-curved array is driven by a motor, moving in the transducer elevation direction ($\phi$ direction). A position encoder senses the movement and provides a trigger signal for the image acquisition. The 2D images are acquired based on the following rule:

$$\tan[\phi(n)] - \tan[\phi(n-1)] = C$$

where C is a constant for all n's. This rule provides constant intervals between the scan planes on a horizontal plane; see FIG. 4.

First 2D Scan Conversion

Figure 5:
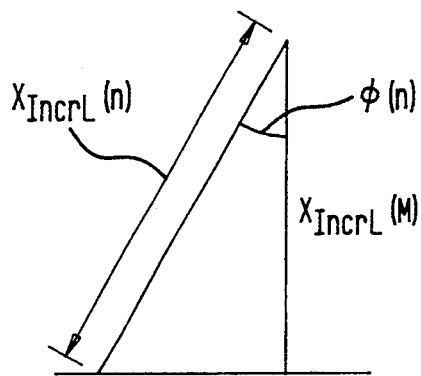
FIG. 5 shows a graphic representation of $X_{IncrL}$ as defined in the present invention.

To simplify the discussion, we make following assumption: the parameter $X_{Start}=0$ in the SC Polar to Rectangular Conversion, so that the apex of the scan is at the top of the rectangle. All other parameters are the same for all scan frames (n:n=1,2 ... 2N+1), except parameter $X_{IncrL}$, which, as shown in FIG. 5, is the following:

$$X_{IncrL}(n) = X_{IncrL}(M)/\cos[\Theta(n)], \text{ for } (n:n=1,2 \ldots 2N+1).$$

The system software downloads the parameter $X_{IncrL}(n)$ from a LUT to a 2D SC for every frame of acquired images as shown in path [1] in FIG. 8.

During real-time image acquisition, the image data goes to a 2D SC for real-time scan conversion, reference number [2] in FIG. 8. The output of 2D SC is received by RP and IP, reference number [3] in FIG. 8. A dynamic transparent image is formed (compounded) inside the RP, and sends it to VM for image display at reference number [3a] in FIG. 8. One or more C-scan images can be formed in the IP.

The IP also sends the post-scan-converted images back to the IM, reference number [4] in FIG. 8. This occurs between two real-time scan conversions. The $n^{th}$ frame image is stored in the $n^{th}$ layer of the IM (k=n) as shown in FIG. 3, where the total number of layers 2K+1 is larger than the total number of 2D slices in the scanned volume, 2N+1.

Real-Time C-Scan Image Formation

Figure 7:
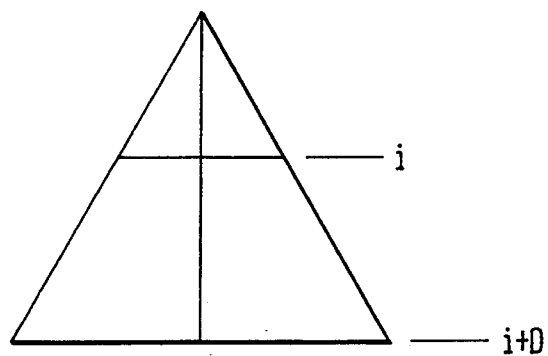
FIG. 7 shows two C-scan image depths of i and i+D of the present invention.

During real-time image acquisition and display, the user can specify one or more C-scan image locations. C-scan images are formed in real-time. To simplify the discussion, assume the user wants to display two C-scan images coming from depth x(i) and depth x(i+D), shown in FIG. 7, where D is a constant, and x(D) is the distance between the two images.

Figure 6:
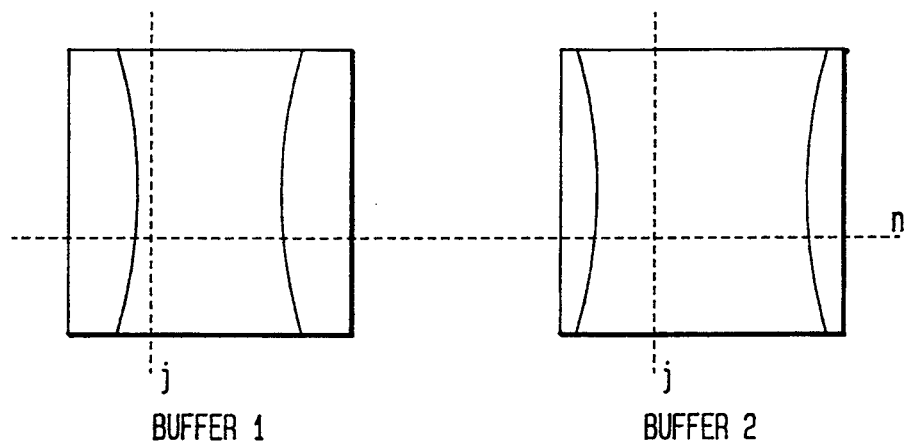
FIG. 6 shows the image buffer 1 and buffer 2 having C-scan images at depths i and i+D of the present invention.

When receiving the $n^{th}$ frame real-time image from a 2D SC, the IP puts the line i(LN=i) and line i+D (LN=i+D) into the $n^{th}$ row of two image buffers, Buffer 1 and Buffer 2 (see FIG. 6). At the end of one volumetric scan, the IP sends the two images in the two buffers one after the other to the 2D SC input, reference number [5] in FIG. 8. The output order of the two images from IP is column by column (j direction). The 2D SC performs two rectangular-to-rectangular scan conversions and sends its output to display, reference number [6] in FIG. 8. The scan conversion parameters are assigned the following rules:

No change in the $Y_{scale}$;

The $X_{scale}$ (actually in the z direction in FIG. 3) is increased (the displayed image size in this direction is reduced) to make the image scale in y and z directions proportional. The increasing factor is proportional to the ratio of 1/i (or 1/(i+D));

The center of the converted image in the X direction (z direction in FIG. 3) is aligned to the line k=K in FIG. 3.

After the rectangular-rectangular scan conversion, the SC outputs the two C-scan images to RP and the VM for display.

Second 2D Scan Conversion and 3D Cubic Image Data Set Formation

After finishing real-time image acquisition, the user may decide to review the 3D volume image. In order to easily form multiplanar, oblique-scan, and volumetric images, the image data in IM is converted to a cubic data matrix. The image data in IM is sent to the 2D SC and back to IM again to complete the process.

The IM outputs its data "vector" in the z direction (see FIG. 3) to the 2D SC, reference number [7] in FIG.

8. Here k is the Range address, and j is the Vector address. The image data in the top-down layer i in the x direction is the $i^{th}$ frame image.

The $i^{th}$ frame image is sent to the 2D SC for a rectangular-rectangular scan conversion which is the same as the conversion in the Real-Time C-scan Image Formation discussed above. The output of the SC is fed back through IP to IM into the $i^{th}$ layer, reference number [8] in FIG. 8. The new data overwrites the old data in the same layer in IM. The IM contents are completely updated after i runs from 1 to I. The image data in IM now is arranged in cubic shape as depicted in FIG. 3.

Second Embodiment

In the first embodiment discussed above, the second scan conversion is not in the $r-\phi$ direction, but the z direction. This could introduce image point-spread function distortion similar to the distortion in some simple 2D scan converters which use one-dimensional linear interpolation. The second embodiment overcomes this problem, however, this embodiment cannot provide C-scan images and dynamic transparent images in real-time.

Figure 9:
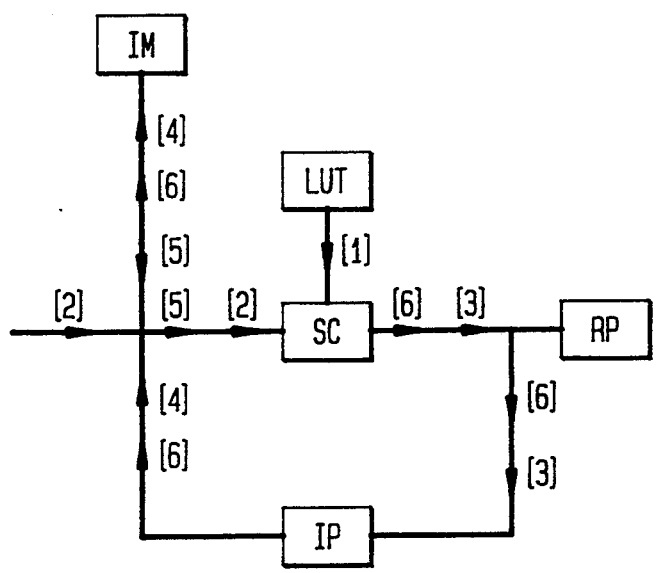
FIG. 9 shows a flowchart of the second embodiment of the present invention.

FIG. 9 shows a flowchart of the second embodiment of the 3D scan converter design of the present invention. The following description of the second embodiment of the present invention makes reference to FIG. 9 and the reference numbers therein.

Image Acquisition Control

A regular phased array or tightly-curved array is driven by a motor, warbling in the transducer elevation direction ($\phi$ direction). A position encoder senses the movement and provides a trigger signal for image acquisition. 2D images are acquired based on the following rule:

$$\phi(n)-\phi(n-1)=C,$$

where C is a constant for all n's. This rule provides constant angular intervals between the scan planes.

First 2D Scan Conversion

All SC parameters are the same for all scan frames (n:n=1 ... 2N+1), path [1] of FIG. 9. During real-time image acquisition, the image data goes to 2D SC for real-time polar-to-rectangular scan conversion, reference number [2] in FIG. 9. The output of 2D SC is received by IP, reference number [3] in FIG. 9. The IP input data vector is in y direction. The IP sends the post scan-converted images back to IM, reference number [4] in FIG. 9. The IP output vector is in the X direction. This occurs between two real-time scan conversions (if there is some time left over). The $n^{th}$ frame image is stored in the $n^{th}$ layer of the IM (k=n) as shown in FIG. 3, where the total number of layers 2K+1 is larger than the total number of 2D slices in the scanned volume, 2N+1.

Second 2D Scan Conversion and 3D Cubic Image Data Set Formation

After real-time Image acquisition, the IM outputs its dam "vector" in the vertical x direction (see FIG. 3) to the 2D SC, reference number [5] in FIG. 9. Here i is considered as the Range address, and k is considered as the Vector address. The image data in the left-right layer j in the y direction is considered as the $j^{th}$ frame image. The $j^{th}$ frame image is sent to the 2D SC for a polar-rectangular ("r"$-\phi$ to x$-$z) scan conversion.

Here "r" is the IM output vertical vector. The SC parameters are the same for all the frames. The output of the SC is fed back through IP to IM into the $j^{th}$ layer, reference number [6]. The new data overwrites the old data in the same $j^{th}$ layer in IM. The IM contents are completely updated after j runs from 1 to 2J+1. The image data in IM is now arranged in cubic shape as shown in FIG. 3.

Although other modifications and changes may be suggested by those skilled in the art, it is the intention of the inventor to embody within the patent warranted hereon all changes and modifications as reasonably and properly come within the scope of his contribution to the art.

I claim:

1. A three-dimensional scan converter system for generating real-time orthogonal multiplanar and transparent images in addition to two-dimensional B-scan images in an ultrasound imaging system, comprising:

means for ultrasonically scanning a subject to obtain real-time image data representing an image of said subject, said ultrasonic scanning means further comprises transducers and a three-dimensional position control means having a position encoder for indicating current transducer position;

image memory means for storing image data representing an image of a subject;

two-dimensional scan converter means for converting the stored image data into three-dimensionally formatted stored image data in real-time;

image processing means for operating on said three-dimensionally formatted stored image data for successive display of said multiplanar orthogonal images;

system software and a CPU, having one or more look-up tables containing scan converter parameters corresponding to said transducer position therein, for downloading said parameters in real-time to said scan converter means;

a raster processing means for compounding said transparent image; and display means for displaying said three-dimensional images.

2. A method for generating real-time orthogonal multiplanar and transparent images in addition to two-dimensional B-scan images in an ultrasound imaging system having transducers, comprising the steps of:

ultrasonically scanning with equal intervals between scan planes a subject to obtain two-dimensional image data representing an image of said subject;

storing said two-dimensional image data;

indicating position of said transducers;

downloading scan converter parameters corresponding to a position of said transducers from a look-up table into a scan converter;

performing a first two-dimensional scan conversion on said stored image data in a first direction into raster two-dimensional images with controlled line density;

storing said resulting first two-dimensionally scan converted image data in said image memory;

performing a second two-dimensional scan conversion on said stored resulting first two-dimensionally scan converted image data in a second direction orthogonal to said first direction;

storing said resulting second two-dimensionally scan converted image data in raster cubic format in said image memory;

displaying stored three-dimensional image data.

3. The method of claim 2, wherein said ultrasonic scanning step of acquiring two-dimensional image data has constant intervals between scan planes defined by $\tan[\phi(n)] - \tan[\phi(n-1)] = C$, where C is a constant for all integer values of n.

4. The method of claim 2, wherein said ultrasonic scanning step of acquiring two-dimensional image data has constant intervals between scan planes defined by $\phi(n) - \phi(n-1) = C$, where C is a constant for all integer values of n.

5. The method of claim 2, wherein said controlled line density of said raster two-dimensional images after said first scan conversion step is further defined by $X_{IncrL}(n) = X_{IncrL}(M)/\cos[\phi(n)]$.

6. The method of claim 2, wherein said controlled line density of said raster two-dimensional images after said first scan conversion step is further defined by $X_{IncrL}(n) = $ Constant.

* * * * *